United States Patent [19]

Biggs

[11] 4,094,377
[45] June 13, 1978

[54] ELECTRICALLY POWERED VEHICLE

[76] Inventor: Herbert W. Biggs, P.O. Box 1510, Hobe Sound, Fla. 33455

[21] Appl. No.: 677,366

[22] Filed: Apr. 15, 1976

[51] Int. Cl.² .......................... B60K 1/00; B60K 3/04
[52] U.S. Cl. .................................. 180/65 C; 126/271; 180/66 B; 180/67
[58] Field of Search ................ 180/65 C, 65 D, 65 B, 180/67, 66 B, 54 B; 126/270, 271

[56] References Cited

U.S. PATENT DOCUMENTS

| | | | |
|---|---|---|---|
| 741,587 | 10/1903 | Meden | 180/65 C |
| 1,095,967 | 5/1914 | Lister | 180/65 R |
| 2,918,982 | 12/1959 | Vlachos | 180/67 |
| 2,920,710 | 1/1960 | Howard | 180/67 |
| 3,339,663 | 9/1967 | Anderson | 180/67 |
| 3,444,946 | 5/1969 | Waterbury | 180/65 B |
| 3,799,144 | 3/1974 | Ramsey et al. | 126/270 |
| 3,874,472 | 4/1975 | Deane | 180/65 C |

OTHER PUBLICATIONS

"Sun Powers Old Car", Popular Mechanics, Jun. 1960, p. 122.

Primary Examiner—David M. Mitchell
Attorney, Agent, or Firm—Wolf, Greenfield & Sacks

[57] ABSTRACT

A battery powered drive system for vehicles comprising a pair of electrical storage batteries designed to be connected alternately to an electric motor which propels the vehicle. A steam engine having a shaft drives a generator also designed to be alternately connected to the storage batteries for recharging, and a steam boiler supplies the steam engine and itself receives energy either from a solar heater, burner or electrical heaters provided for that purpose.

6 Claims, 2 Drawing Figures

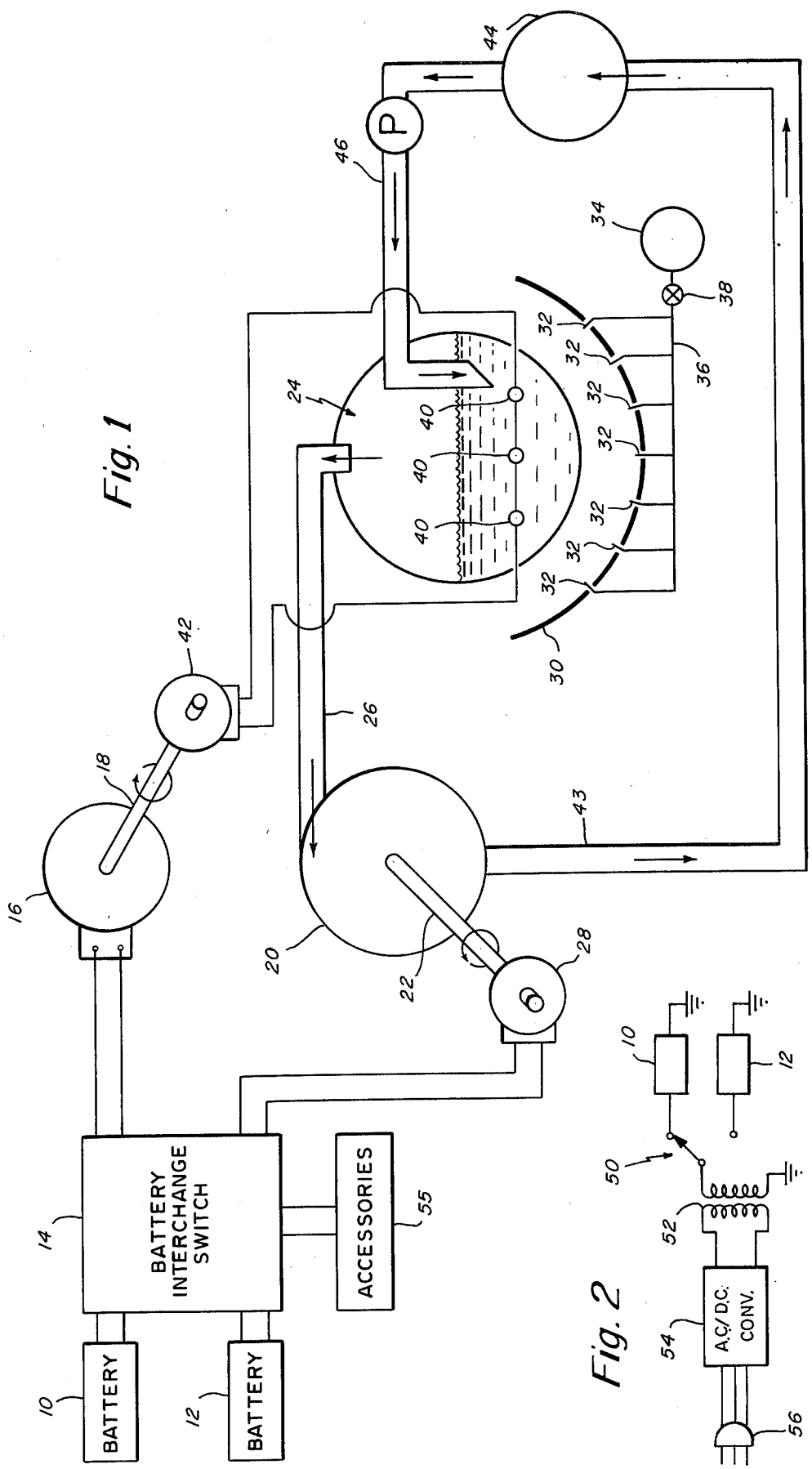

4,094,377

ELECTRICALLY POWERED VEHICLE

INTRODUCTION

This invention relates to electrically powered vehicles and more particularly comprises a new and improved battery powered drive system for vehicles and a charging system for the batteries.

The high cost of petroleum, its decreasing supply, and the concern of the public with ecology have created a very wide interest in alternative means for powering motor vehicles. Electric storage batteries as a power source have for many years been recognized as a possible alternative, but thus far no satisfactory battery operated vehicle has been developed. The battery powered vehicles now available have several limitations which have prevented their widespread use. The principle disadvantage of such vehicles is their limited range and the requirement of an available service outlet to recharge the batteries.

The principle object of this invention is to provide an auxiliary means of recharging the storage batteries in the system from a source other than an electrical outlet so as to increase the operative range of the vehicle.

Another object of this invention is to provide a charging system for storage batteries in a vehicle, which utilizes solar energy.

Another object of this invention is to provide an auxiliary source for recharging the batteries of a battery operated vehicle, which is dependent neither upon an available electrical service outlet or the sun's energy.

To accomplish these and other objects, the battery powered drive system and charge system for the batteries of this invention include a pair of electrical storage batteries which may alternatively be connected to the main electric drive motor of the vehicle. While one battery is being used as an energy source to drive the vehicle, the other may be recharged either when the vehicle is moving or at rest, and either in daylight or at night. The auxiliary charging system for the batteries includes a steam engine powered by steam generated by a boiler carried on the vehicle which in turn is heated either by a solar heater or by auxiliary gas burners. These auxiliary recharging systems are ancillary to the primary charging source which is a standard electrical service outlet. These and other objects and features of this invention will be better understood and appreciated from the following detailed description read in connection with the accompanying drawings.

BRIEF FIGURE DESCRIPTION

FIG. 1 is a diagrammatic view of the battery powered drive system and recharging system for the embodiment of this invention; and FIG. 2 is a schematic diagram showing the circuit for charging the batteries from a service outlet.

DETAILED DESCRIPTION

The battery powered drive system and battery recharging system of this invention shown in FIG. 1 includes a pair of batteries 10 and 12 which are adapted to be selectively connected through switching system 14 to the main electric drive motor 16 of the vehicle. The drive motor 16 is connected to drive shaft 18 which may be connected either through a clutch and gear box or directly to the axle of the driven wheels of the vehicle. Obviously this invention is applicable both to front wheel and rear wheel drive vehicles, and the details of the manner in which shaft 18 is connected to the driven wheels of the vehicle is not part of this invention.

The assembly of FIG. 1 also includes a steam engine 20 having an output shaft 22 that forms an integral part of the recharging system of the present invention. The steam engine 20 may be either a rotary or reciprocating type and is powered by steam generated in boiler 24 shown schematically connected to the engine by duct 26. A generator 28 is mounted on and driven by the output shaft 22 of steam engine 20, and it in turn supplies electrical power to the batteries 10 and 12 through the battery interchange switching system 14. As is described below in connection with the operation of the system, the output of generator 28 is ordinarily used to re-energize the battery not at the time being used to propel the vehicle.

The boiler 24 which generates steam to drive the steam engine 20 may be of simple cylindrical construction and serves as a reservoir for the liquid vaporized in it and which drives the steam engine. The liquid may be water or freeon or other refrigerant, and the term steam is intended to include the gaseous state of those materials as well. In the embodiment shown energy is supplied to boiler 24 from one or more of three different sources. The primary source is solar reflector 30 which may be in the form of a parabolic curve. The reflector is designed to focus the sun's rays on a relatively small surface area of the boiler to supply the heat necessary to generate steam in boiler 24 required for the steam engine.

The second source of heat for the boiler 24 is provided by a series of burners 32 which in the embodiment shown are mounted in the face of the reflector 30 in a position to direct heat directly to the boiler surface. The burners may burn propane, alcohol, or any other flammable fluid which is stored in auxiliary tank 34. The tank 34 is connected to the several burners through duct 36, and valve 38 in the duct controls the flow of the flammable fluid from the tank to each of the burners.

Resistance heaters 40 shown schematically in FIG. 1 are a third source of heat for the boiler 24, and they are energized by generator 42 in turn driven by drive shaft 18. Thus, the three different energy sources, namely, the solar reflector 30, the burners 32 and the resistors 40 are available to generate steam in the boiler to supply steam to the engine 20.

The spent steam from the steam engine 20 is returned to boiler 24 by duct 42 which contains condenser 44. The condenser 44 may be in the form of a small automotive radiator, and the liquid discharged by the condenser is returned to the boiler by duct 46. Compression may be supplied from shock absorbers or some similar arrangement in the vehicle to increase the efficiency of the condenser. And a small pump may be included in the system to return the liquid to the boiler, if necessary. That pump could be run off the generator 28.

The batteries 10 and 12 of course may represent in each instance a bank of long lasting lightweight rechargeable storage batteries, and through the battery interchange switching system 14 the banks are designed to be alternately connected to the electric drive motor 16. To recharge the battery, the battery interchange switching system is used to connect the battery to be charged to generator 28. The generator 28 in turn is driven by the steam engine 20 which receives the live steam from boiler 24. When the vehicle is at rest, the solar reflector 30 under proper weather conditions may harness the sun's energies to generate steam in the boiler, which in turn will drive the engine 20 to operate the generator 28 and recharge the batteries. When either the weather or the time of day prohibits the use of the solar reflector to generate steam in the boiler, the gas burners may be used for that purpose. By opening valve 38 the flammable fluid is allowed to flow to each of the burners from the reservoir 34. And, when the vehicle is in operation, the generator 42 driven off the vehicle drive shaft may be used either directly to recharge the battery bank or the generator output may be used to energize the resistance heaters 40 in the boiler which in turn creates steam to drive the steam engine 20.

It is of course intended that the recharging system described is ancillary to the recharging system powered from a 220V AC service outlet. In FIG. 2 the schematic diagram illustrates means for that purpose. In the diagram, batteries 10 and 12 are shown connected through a switching system 50 to the output coils of the 12 volt transformer 52, whose input coil is connected through an AC/DC converter 54 to the service outlet plug 56. Whenever the vehicle is at rest and a 220V AC source is available, it is of course desirable and economical that the batteries be recharged from that source.

It should be noted that the accessories represented by box 55 are connected to the interchange switch 14 and they may be operated either from the batteries or one of the other generators 28 and 42.

Having described this invention in detail, those skilled in the art will appreciate that modifications may be made thereof without departing from the spirit of this invention. Therefore it is not intended that the scope of this invention be limited to the specific embodiment illustrated and described. Rather, it is intended that the breadth of this invention be determined by the appended claims and their equivalents.

What is claimed is:

1. A battery powered drive system for vehicles comprising
   an electric drive motor and drive shaft adapted to propel a vehicle,
   a pair of electrical storage batteries,
   circuit means for selectively connecting one or the other of said batteries to said motor,
   a steam engine having a shaft and a generator mounted on said shaft,
   a steam boiler,
   a solar heater mounted in operative relation to the boiler for heating liquid in the boiler to generate steam,
   a duct connected between the boiler and the engine for conveying steam generated by the boiler to the steam engine and returning the exhaust of the steam engine to the boiler,
   switching means connected between the generator and the batteries for selectively connecting the generator to one or the other of said batteries for recharging the batteries,
   gas burners disposed immediately adjacent the boiler for heating liquid in the boiler,
   a gas container connected to the burners,
   and means for selectively operating the burners to heat the liquid in the boiler.

2. A system as described in claim 1 further characterized by
   said solar heater including a parabolic reflector,
   said steam boiler being mounted at the focal point of said reflector to receive solar energy directly from the reflector.

3. A system as described in claim 2 further characterized by
   said burners being mounted in the reflector to heat the liquid in the boiler.

4. A system as described in claim 1 further characterized by
   a condenser in the duct between the exhaust of the steam engine and boiler for condensing the lower pressure steam which leaves the steam engine,
   and a pump connected to the duct for moving the liquid in the condenser into the boiler.

5. A system as described in claim 1 further characterized by
   control means connected to the circuit means and switching means for selectively connecting one of the batteries to the motor and the other of the batteries to the generator.

6. A system as described in claim 5 characterized by a transformer and service plug connected to the batteries for energizing them from an A.C. outlet.

* * * * *